May 6, 1941.　　　　C. M. ROSE　　　　2,240,860
COUPLING SEAL
Filed Jan. 30, 1939　　　2 Sheets-Sheet 1
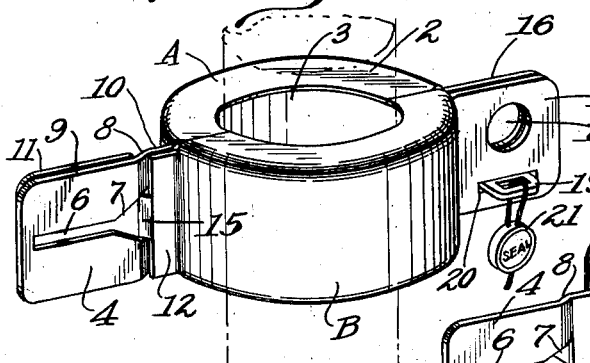
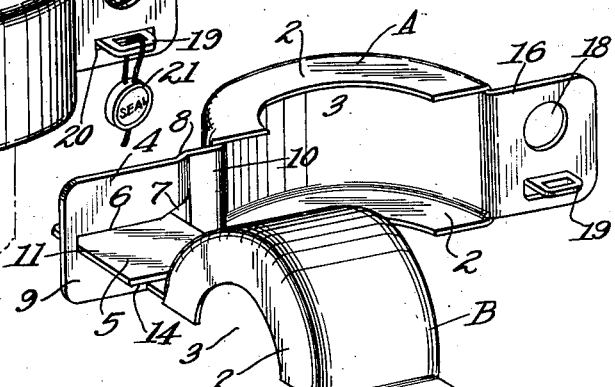
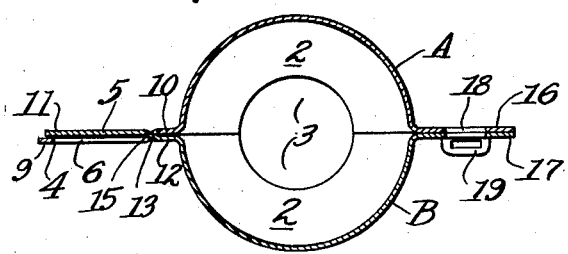
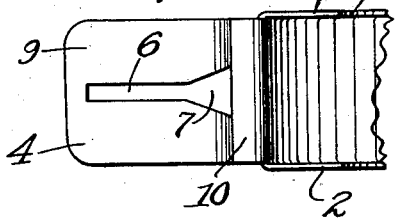
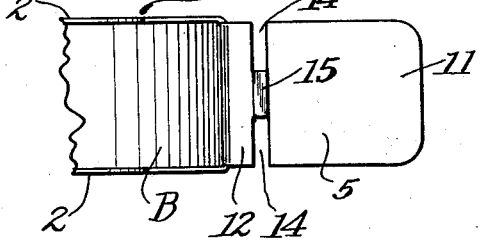
Inventor
Chester M. Rose
By W. S. McDowell
Attorney May 6, 1941. C. M. ROSE 2,240,860
COUPLING SEAL
Filed Jan. 30, 1939 2 Sheets-Sheet 2

Inventor
Chester M. Rose

By W. S. McDowell
Attorney

Patented May 6, 1941

2,240,860

UNITED STATES PATENT OFFICE 2,240,860

COUPLING SEAL

Chester M. Rose, Columbus, Ohio, assignor to United Seal Company, Columbus, Ohio, a corporation of Ohio Application January 30, 1939, Serial No. 253,478

3 Claims. (Cl. 292—307)

This invention relates to meter seals and, more particularly, to seals of the type which are placed around the couplings of pipes when the latter enter recording meters to detect or prevent unauthorized access to and manipulation of the couplings for the purpose of wrongfully using gas or other fluid supplied by municipal or public service corporations.

Such seals are quite commonly formed to comprise a pair of shells adapted when joined to surround and enclose a meter coupling, the shells being hinged together at one end and united at their other end by a lead and wire sealing element. It is an object of the present invention to provide an improvement upon seals of this type wherein the seal proper comprises but two members formed from stamped sheet metal and shaped to embrace a meter coupling and wherein the adjoining ends of said members are provided with interfitting slots and tongues by which the coupling members are hingedly united without involving the use of hinge pintles.

Another object is to simplify and reduce the cost of producing such seals.

The invention is embodied in the example herein shown and described, the features of novelty being finally claimed.

In the accompanying drawings:

Fig. 1 is a perspective view disclosing the seal comprising the present invention with the two members thereof in assembled order;

Fig. 2 is a similar view disclosing the seal members in the position in which they are initially joined;

Fig. 3 is a horizontal sectional view taken through the seal;

Fig. 4 is a detail elevational view disclosing the slotted hinge tongue of one of the seal members;

Fig. 5 is a similar view disclosing the complemental hinge tongue of the other seal member.

Figure 6:
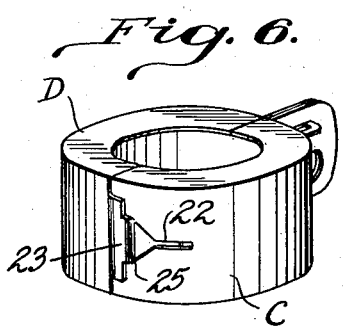
Fig. 6 is a perspective view disclosing a slightly modified form of seal with the separable sections thereof in assembled relationship.

Referring more particularly to the drawings, the construction disclosed embodies a protective casing, generally referred to in the art as a meter seal. This casing is formed to comprise two shell sections or members, preferably made of pressed sheet steel. One of these sections or members is designated by the letter A, while the other complemental section is designated at B. Both sections are formed to comprise hollow semicircular bodies, the side flanges 2 of which are recessed as at 3 to conform to the outside diameters of the pipes or other fittings around which the casing is placed, a coupling for such pipes being received within the hollow bodies of the sections A and B and completely surrounded thereby, as will be readily understood by those versed in the art.

Each of the sections A and B is formed at one side with an integral hinge tongue, the tongue of the section or member A being designated by the numeral 4, and that of the section B by the numeral 5. The particular feature of the present invention resides in the construction employed for hingedly uniting these tongues. This result is accomplished by providing the tongue 4 of the section A with a centrally located longitudinally extending slot 6. This slot, for the greater portion of its length, is of uniform width, being slightly greater than that of the thickness of the material from which the sections are formed. Toward its inner end, however, the slot 6 is enlarged in width to produce a region 7 of substantially triangular form. Also the tongue 4, contiguous to its inner end, is bent to form an offset 8 so that the outer portion of the tongue, represented by the numeral 9, occupies a vertical plane laterally displaced from that occupied by the inner portion 10 of the tongue 4.

Likewise, the tongue 5 of the section B includes an outer portion 11 which is laterally displaced relative to the inner portion 12 by the bend 13, so that the said outer portion 11 will occupy the vertical plane in which the inner portion 10 of the tongue 4 is disposed, the inner portion 12 of the tongue 5 being disposed in the vertical plane occupied by the outer portion 9 of the tongue 4. In the region of the bend 13, the tongue 5 is provided with a pair of vertically registering, transversely extending slots 14, which open at their ends to the upper and lower edges of the tongue 5, as disclosed in Fig. 5.

In joining the casing sections, the latter are first placed in the relative order disclosed in Fig. 2, with the outer portion of the tongue 5 entering the slot 6. With the sections thus located, the tongue 5 is advanced through the slot 6 until the transverse slots 14 of the tongue 5 are brought into vertical registration with the outer portion 9 of the tongue 4. While this registration is secured, the coupling section B is rotated through an arc of substantially 90 degrees with the web 15 of the tongue 5 formed between the closed ends of the slots 14 occupying the enlarged triangular region 7 of the slot 6, the width of the region 7 permitting of the turning movement therein of the web 15, thus bringing the tongues 4 and 5 into adjacent parallel order, with the parts arranged as disclosed in Figs. 1 and 3. The two sections of the seal are thus joined for hinge-like movement around the couplings of meter connections, or other fluid transmitting pipe systems. It will be noted that the construction avoids the use of hinge pins, which are relatively costly to produce and forms an interlocking tongue construction of tamper-proof design.

The sections A and B, at the sides thereof opposed to the tongues 4 and 5, are formed with integral, outwardly directed ears, the ear provided on the section A being designated at 16, and that on the section B at 17. When the casing is in its assembled form, these ears adjoin and engage one another, as disclosed in Figs. 1 and 3. These ears may be formed with registering openings 18 for the reception of the hasp or yoke of a padlock or a lead rivet. Also, the ear 16 is stamped to produce a horizontally disposed lug 19, the latter being adapted to pass through and project beyond a slot 20, suitably produced in the ear 17. With the casing parts assembled, as in Fig. 1, the wire of a lead-wire seal 21 or a padlock hasp may be passed through the slot 20, thus preventing unauthorized separation of the casing sections without detection of the fact of separation.

Figure 7:
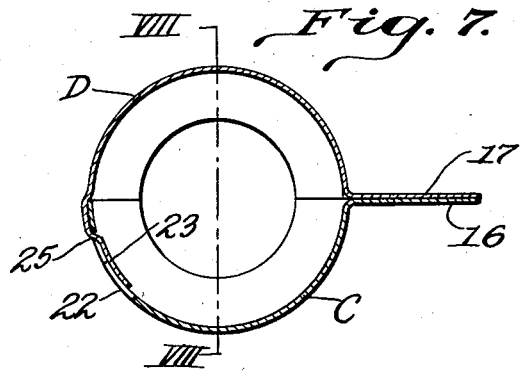
Fig. 7 is a horizontal sectional view of the seal shown in Fig. 6.
Figure 8:
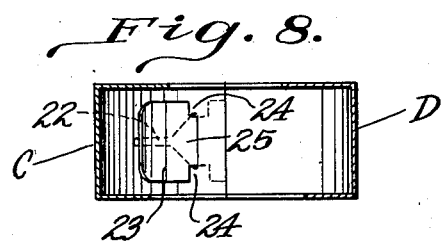
Fig. 8 is a vertical transverse sectional view taken on the plane indicated by the line VIII—VIII of Fig. 7.

In the modified form of the invention shown in Figs. 6, 7 and 8, the seal section C corresponds to the section A in the preferred form but is slightly modified by the omission of the hinge tongue. The side wall of the section C is formed with a slot 22 conforming substantially to the shape of the opening 6 in the tongue 4 of the section A. A tongue 23 projects from the edge of the side wall of the section D and constitutes a continuation thereof. This tongue is slightly reduced in width and is provided with aligned slot 24 on opposite sides. A narrow neck 25 is produced in the tongue by the slots and this is bent or offset inwardly to dispose the free end of the tongue within the seal when the sections are in assembled relationship.

To assemble the sections C and D, the latter is turned at right angles to the former and the tongue 23 slipped into the slot 22 until the slots 24 register with the side wall of the section C. The section D is then moved to a normal position at which time the neck 25 will be disposed in the wide end of the slot 22. As in the preferred form of the invention, the opposite edges of the sections C and D are provided with perforated abutting ears 16 and 17 for the reception of the lead sealing element.

Figure 9:
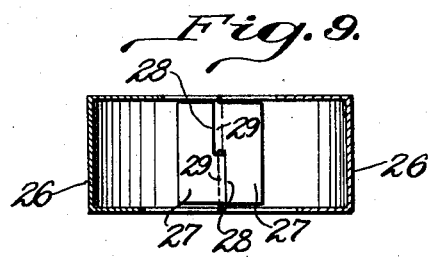
Fig. 9 is a similar view of a further modified form of seal.
Figure 10:
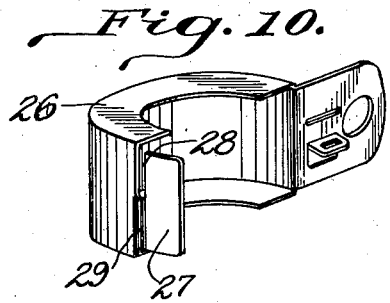
Fig. 10 is a perspective view disclosing one of the separable sections of which the seal shown in Fig. 9 is composed.

The form of the invention shown in Figs. 9 and 10 is composed of a pair of identical sections 26—26, each of which has an extension 27 formed on one edge of the side wall. A slot 28 extends about half the distance across the extension to form a neck 29 which is bent to position the major portion of the extension inward with respect to the side wall. When the sections 26 are positioned in opposed relation with the ears 16 and 17 in spaced order, the necks 29 of each section may be inserted into the slot 28 of the other section after which the sections may be moved to a position wherein the ears 16 and 17 will be in abutting relationship. When the sections are thus positioned, the extensions 27 are disposed within the seal, making it tamper-proof.

Figure 12:
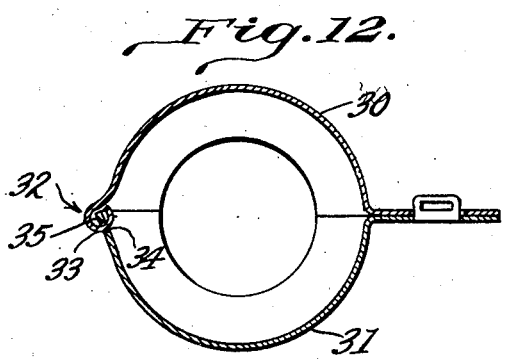
Fig. 12 is a horizontal sectional view of the seal shown in Fig. 11 and illustrating the hinge joint between the sections.
Figure 11:
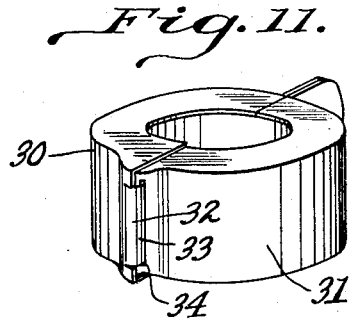
Fig. 11 is a perspective view of a seal in which the sections are substantially permanently joined.

In Figs. 11 and 12, the seal sections 30 and 31 are permanently joined by a hinge 32 consisting of a tongue 33 formed on one section and extending through a slot 34 provided in the other section. After the tongue is positioned in the slot, it is bent to form a loop in which a bail 35 caused by the formation of the slot 34, is free to pivot, providing the hinge connection between the sections.

What is claimed is:

1. A protective casing for pipe couplings comprising a pair of pressed steel sections, each of said sections having a flanged semicircular body formed to surround a pipe coupling when the two sections are in assembled order, each of said sections having integrally formed therewith at one side an outwardly extending radially projecting hinge tongue, the hinge tongue of one of said sections being formed with a longitudinally extending slot enlarged in width at one end, the complemental hinge tongue of the other of said sections being formed with vertically registering transversely extending slots united by a web, said web being capable of turning movement in the enlarged portion of the longitudinal slot of the other tongue, and integral apertured ears projecting from the opposite side of said sections, as regards said tongues, said ears being adapted for the reception of a sealing device, said slotted hinge tongues of both sections being interengaged and contiguous along their inner surfaces when in protecting position.

2. A coupling protector comprising a pair of sheet metal sections each having a flanged semicircular body formed to surround a pipe coupling when the sections are in assembled order, a tongue extending radially outward from one end of the semicircular body of one section, the sides of said tongue being formed with registering recesses to provide a narrow neck which is bent to position the spaced portions of the tongue in offset relationship, the other section being provided with an outwardly extending radial tongue having a slot-like opening for the reception of said first named tongue, said slot being increased in width at one end to fit said neck, the bend in said neck serving to dispose the spaced portions of the tongue on opposite sides and parallel to the portions of said second section adjacent to said slot, and integral apertured ears projecting from the opposite side of said sections as regards said tongue and slot, said ears abutting when said sections are operatively disposed, said slotted tongues of both sections interengaged and continguous along their inner surfaces when in protecting position.

3. A coupling protector comprising a pair of sheet metal sections each having a flanged body formed to surround a pipe coupling when the sections are in assembled order, a tongue extending radially outward from one end of the body of one section, said tongue being transversely slotted to provide a narrow neck, said neck being bent to position the portions of the tongue on either side thereof in offset relationship, the other section being formed with an outwardly extending radial tongue having a slot in which the neck of the first named tongue is positioned when the sections are in assembled order, the bend in said neck serving to dispose the portions of said section adjacent to the neck on opposite sides and parallel to the portions of said second section adjacent to the slot therein, and integral apertured ears projecting from the opposite side of said sections as regards said tongue and slot, said ears abutting when said sections are operatively disposed, said slotted tongues of both sections interengaged and contiguous along their inner surfaces when in protecting position.

CHESTER M. ROSE.